US010550702B2

(12) United States Patent
Leon et al.

(10) Patent No.: US 10,550,702 B2
(45) Date of Patent: Feb. 4, 2020

(54) TURBINE DISK

(71) Applicant: UNITED TECHNOLOGIES CORPORATION, Farmington, CT (US)

(72) Inventors: Jeffrey Leon, Glastonbury, CT (US); William Indoe, West Hartford, CT (US); Kimberly Caruso, Hartford, CT (US); Brian J. Burke, South Windsor, CT (US); Kurt Leach, Amston, CT (US); Fabian D. Betancourt, Meriden, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 242 days.

(21) Appl. No.: 15/694,499

(22) Filed: Sep. 1, 2017

(65) Prior Publication Data
US 2019/0071972 A1 Mar. 7, 2019

(51) Int. Cl.
*F01D 5/30* (2006.01)
*F01D 5/32* (2006.01)
(Continued)

(52) U.S. Cl.
CPC .............. *F01D 5/3007* (2013.01); *F01D 5/02* (2013.01); *F01D 5/3015* (2013.01); *F01D 5/323* (2013.01);
(Continued)

(58) Field of Classification Search
CPC ......... F01D 5/3015; F01D 5/323; F01D 5/326
See application file for complete search history.

(56) References Cited

U.S. PATENT DOCUMENTS 3,644,058 A * 2/1972 Barnabei ................. F01D 5/081
416/95
3,728,042 A * 4/1973 Hugoson ................. F01D 5/081
416/95
(Continued)

FOREIGN PATENT DOCUMENTS

CN 106624665 5/2017
EP 0222679 5/1987
(Continued)

OTHER PUBLICATIONS

USPTO, Pre-Interview First Office Action dated Feb. 27, 2019 in U.S. Appl. No. 15/694,394.
(Continued)

*Primary Examiner* — Kevin R Steckbauer
(74) *Attorney, Agent, or Firm* — Snell & Wilmer, L.L.P.

(57) ABSTRACT

A turbine rotor disk for a gas turbine engine includes a disk rotationally disposed about a central axis. The disk includes a bore, a rim and a web disposed radially between the bore and the rim. The rim includes a first radially outermost rim portion and a second radially outermost rim portion disposed radially inward of the first radially outermost rim portion. First and second blade posts are disposed proximate the first radially outermost rim portion and spaced circumferentially. First and second tabs are disposed proximate the second radially outermost rim portion and positioned radially inward of the first and second blade posts. A slot is disposed circumferentially between the first tab and the second tab. The first tab and the second tab have an axial profile that includes a blade post transition portion, a slope portion radially inward of the blade transition portion and a face portion radially inward of the slope portion.

17 Claims, 7 Drawing Sheets

(51) Int. Cl.
    *F01D 5/02* (2006.01)
    *F01D 11/00* (2006.01)
(52) U.S. Cl.
    CPC ............ *F01D 5/326* (2013.01); *F01D 11/001* (2013.01); *F05D 2220/32* (2013.01)

(56) References Cited

U.S. PATENT DOCUMENTS

| | | | | |
|---|---|---|---|---|
| 3,748,060 | A * | 7/1973 | Hugoson | F01D 5/081 |
| | | | | 416/92 |
| 3,853,425 | A * | 12/1974 | Scalzo | F01D 5/18 |
| | | | | 416/95 |
| 3,957,393 | A | 5/1976 | Bandurick | |
| 4,344,740 | A | 8/1982 | Trenschel et al. | |
| 4,439,107 | A * | 3/1984 | Antonellis | F01D 5/081 |
| | | | | 415/115 |
| 4,457,668 | A * | 7/1984 | Hallinger | F01D 5/26 |
| | | | | 416/190 |
| 4,846,628 | A | 7/1989 | Antonellis | |
| 5,112,193 | A * | 5/1992 | Greer | F01D 5/3015 |
| | | | | 416/220 R |
| 5,302,086 | A * | 4/1994 | Kulesa | F01D 5/3007 |
| | | | | 416/220 R |
| 5,954,477 | A * | 9/1999 | Balsdon | F01D 11/006 |
| | | | | 415/173.7 |
| 6,471,474 | B1 | 10/2002 | Mielke | |
| 6,736,706 | B1 * | 5/2004 | Pan | B24C 3/327 |
| | | | | 451/36 |
| 6,851,924 | B2 | 2/2005 | Mazzola | |
| 7,192,245 | B2 * | 3/2007 | Djeridane | F01D 5/082 |
| | | | | 415/115 |
| 7,354,241 | B2 * | 4/2008 | Djeridane | F01D 5/082 |
| | | | | 415/115 |
| 7,371,046 | B2 | 5/2008 | Lee | |
| 7,371,050 | B2 * | 5/2008 | Pasquiet | F01D 5/3015 |
| | | | | 416/204 A |
| 7,387,494 | B2 | 6/2008 | Yehle | |
| 7,484,936 | B2 * | 2/2009 | Bouchard | F01D 11/006 |
| | | | | 415/173.3 |
| 7,500,832 | B2 * | 3/2009 | Zagar | F01D 5/3015 |
| | | | | 416/220 R |
| 8,047,787 | B1 | 11/2011 | Liang | |
| 8,992,177 | B2 * | 3/2015 | Wu | F01D 5/082 |
| | | | | 415/115 |
| 9,174,292 | B2 * | 11/2015 | Joslin | B23H 5/04 |
| 9,249,676 | B2 | 2/2016 | Antonellis | |
| 9,482,094 | B2 * | 11/2016 | Justl | F01D 5/081 |
| 10,072,585 | B2 * | 9/2018 | Mosley | F02C 9/18 |
| 2004/0106365 | A1 * | 6/2004 | Pan | B24C 3/327 |
| | | | | 451/99 |
| 2005/0265849 | A1 | 12/2005 | Bobo | |
| 2005/0271511 | A1 * | 12/2005 | Pasquiet | F01D 5/3015 |
| | | | | 416/220 R |
| 2006/0120855 | A1 * | 6/2006 | Djeridane | F01D 5/082 |
| | | | | 415/115 |
| 2006/0245927 | A1 | 11/2006 | Yehle | |
| 2006/0269400 | A1 * | 11/2006 | Girgis | F01D 5/081 |
| | | | | 415/115 |
| 2007/0116571 | A1 * | 5/2007 | Djeridane | F01D 5/082 |
| | | | | 416/115 |
| 2008/0008593 | A1 * | 1/2008 | Zagar | F01D 5/3015 |
| | | | | 416/220 R |
| 2008/0025843 | A1 | 1/2008 | Scope | |
| 2009/0110561 | A1 * | 4/2009 | Ramerth | F01D 5/082 |
| | | | | 416/96 R |
| 2009/0260994 | A1 * | 10/2009 | Joslin | B23H 5/04 |
| | | | | 205/662 |
| 2011/0123325 | A1 * | 5/2011 | Morris | F01D 5/3015 |
| | | | | 415/208.1 |
| 2012/0148406 | A1 * | 6/2012 | Halfmann | F01D 5/085 |
| | | | | 416/95 |
| 2012/0315142 | A1 | 12/2012 | Bosco | |
| 2013/0115081 | A1 * | 5/2013 | Wu | F01D 5/082 |
| | | | | 416/1 |
| 2014/0056713 | A1 | 2/2014 | Tomeo et al. | |
| 2014/0308133 | A1 | 10/2014 | Gendraud et al. | |
| 2016/0003166 | A1 * | 1/2016 | Mosley | F02C 7/18 |
| | | | | 416/95 |
| 2016/0032727 | A1 | 2/2016 | Hough | |
| 2016/0090841 | A1 | 3/2016 | Himes et al. | |
| 2016/0153302 | A1 | 6/2016 | Samudrala et al. | |
| 2016/0208612 | A1 | 7/2016 | Corcoran et al. | |
| 2016/0222787 | A1 | 8/2016 | Beattie | |
| 2016/0245297 | A1 | 8/2016 | Husted | |
| 2016/0265551 | A1 | 9/2016 | Bailey | |
| 2017/0159450 | A1 | 6/2017 | Buhler | |
| 2018/0266256 | A1 | 9/2018 | Adavikolanu | |
| 2018/0283178 | A1 * | 10/2018 | Casaliggi | F01D 5/081 |
| 2019/0071970 | A1 * | 3/2019 | Leon | F01D 5/3015 |

FOREIGN PATENT DOCUMENTS

| | | |
|---|---|---|
| EP | 0475879 | 3/1992 |
| EP | 1426142 | 6/2004 |
| EP | 2589753 | 5/2013 |
| EP | 3219910 | 9/2017 |
| EP | 3339576 | 6/2018 |
| EP | 3382146 | 10/2018 |
| FR | 2940351 | 6/2010 |
| WO | 2012092223 | 7/2012 |

OTHER PUBLICATIONS

European Patent Office, European Search Report dated Nov. 27, 2018 in Application No. 18192199.0.
European Patent Office, European Search Report dated Nov. 28, 2018 in Application No. 18192194.1.
Leon et al, U.S. Appl. No. 15/694,394, filed Sep. 1, 2017 and entitled Turbine Disk.
Leon et al, U.S. Appl. No. 15/694,420, filed Sep. 1, 2017 and entitled Turbine Disk.
Leon et al, U.S. Appl. No. 15/694,475, filed Sep. 1, 2017 and entitled Turbine Disk.
Leon et al, U.S. Appl. No. 15/694,488, filed Sep. 1, 2017 and entitled Turbine Disk.
European Patent Office, European Search Report dated Feb. 12, 2019 in Application No. 18192283.2.
European Patent Office, European Search Report dated Feb. 14, 2019 in Application No. 18192268.3.
European Patent Office, European Search Report dated Feb. 20, 2019 in Application No. 18191493.8.
David Taylor et al: "The variable-radius notch: Two new methods for reducing stress concentration", Engineering Failure Analysis, Dec. 30, 2010 (Dec. 30, 2010), pp. 1009-1017, Retrieved from the Internet URL: https://ac.els-cdn.com/S135063071000244X/1-s2.0-S135063071000244X-main.pdf?tid=31a64bdf-f4b4-49e7-a8ba-08a2de12a5c5&acdnat=1548324912 31b077efeedf5ceaf26c9e7cc279e 61b, [retrieved on Jan. 24, 2019].
USPTO, Non-Final Office Action dated May 15, 2019 in U.S. Appl. No. 15/694,420.
USPTO, Final Office Action dated May 31, 2019 in U.S. Appl. No. 15/694,394.

* cited by examiner

TURBINE DISK

FIELD

The present disclosure relates to turbine engines and, more particularly, to rotors and rotor disks used in turbine engines.

BACKGROUND

Gas turbine engines, such as those utilized in commercial and military aircraft, include a compressor that compresses air, a combustor that mixes the compressed air with a fuel and ignites the mixture, and a turbine that expands the resultant gases from the combustion. The expansion of the gases through the turbine drives rotors within the turbine (referred to as turbine rotors) to rotate. The turbine rotors are connected to a shaft that is connected to rotors within the compressor (referred to as compressor rotors), thereby driving the compressor rotors to rotate.

In some gas turbine engines, or sections of some gas turbine engines, the rotors are exposed to significant temperatures. For example, in turbine sections, the resultant gases from the combustion process expose the turbine disks and, particularly, the rim portions of the turbine disks, to highly elevated temperatures. Combined with repeated acceleration and deceleration associated with normal operation, the disks may experience low cycle fatigue or thermal mechanical fatigue. Discontinuities in disk geometries may exacerbate the onset of such fatigue.

SUMMARY

In various embodiments, a turbine rotor for a gas turbine engine includes a disk rotationally disposed about a central axis. The disk includes a bore, a rim and a web disposed radially between the bore and the rim. The rim includes a first radially outermost rim portion and a second radially outermost rim portion disposed radially inward of the first radially outermost rim portion. A first blade post is disposed proximate the first radially outermost rim portion and a second blade post is disposed proximate the first radially outermost rim portion and spaced circumferentially a distance from the first blade post. A first tab is disposed proximate the second radially outermost rim portion and positioned radially inward of the first post and a second tab is disposed proximate the second radially outermost rim portion and positioned radially inward of the second post. A slot is disposed circumferentially between the first tab and the second tab. The first tab and the second tab may have an axial profile that includes a blade post transition portion, a slope portion radially inward of the blade transition portion and a face portion radially inward of the slope portion.

In various embodiments, a third blade post is disposed proximate the first radially outermost rim portion. The third blade post may be positioned circumferentially between the first blade post and the second blade post and radially outward of the slot. In various embodiments, the slot has a circumferential length ranging from about 0.910 inches (23.11 mm) to about 0.930 inches (23.62 mm). In various embodiments, the first blade post has a tip and a base and the blade post transition portion of the first tab is disposed at a location between the tip and the base. The tip and the base of the first blade post may define a length in the radial direction and the blade post transition portion may be disposed at a location between about 25% and about 50% of the length in the radially outward direction.

In various embodiments, the slope portion of the first tab extends radially inward from the blade post transition portion. The slope portion of the first tab may also extend radially inward from the blade post transition portion at an angle with respect to the central axis. The slope portion may also merge with the face portion. In various embodiments, the slope portion extends radially inward at an angle of about 60 degrees to about 65 degrees with respect to the central axis and the blade post transition portion has a radius of curvature of about 0.194 inches (4.92 mm) to about 0.214 inches (5.43 mm). In various embodiments, the slope portion extends radially inward at an angle of about 60 degrees to about 65 degrees with respect to the central axis and the face portion extends radially inward at an angle of about 85 degrees to about 95 degrees with respect to the central axis. In various embodiments, a radial length between the blade transition portion and a radially outermost point of the face portion ranges from about 0.590 inches (14.98 mm) to about 0.600 inches (15.24 mm).

In various embodiments, a turbine rotor for a gas turbine engine includes a disk rotationally disposed about a central axis. The disk includes a bore, a rim and a web disposed radially between the bore and the rim. A plurality of blade posts is disposed on and spaced circumferentially about a radially outermost portion of the disk. A plurality of tabs is disposed on and spaced circumferentially about a portion of the disk radially inward from the radially outermost portion of the disk. A plurality of slots may be circumferentially interspersed between adjacent pairs of tabs. Each tab may have an axial profile. The axial profile of each one of the plurality of tabs may include a blade post transition portion, a slope portion radially inward of the blade transition portion and a face portion radially inward of the slope portion.

In various embodiments, the blade posts have a tip and a base and the blade post transition portions of the tabs are disposed at a location between the tip and the base. The slope portions may extend radially inward from the blade post transition portions at an angle with respect to the central axis and the slope portions may merge with the face portions. In various embodiments, the blade post transition portions have a radius of curvature of about 0.194 inches (4.92 mm) to about 0.214 inches (5.43 mm). The slope portions may extend radially inward at an angle of between about 60 degrees and about 65 degrees with respect to the central axis. In various embodiments, the slope portions extend radially inward at an angle of about 62 degrees with respect to the central axis and each corresponding face portion extends radially inward at an angle of about 90 degrees with respect to the central axis. In various embodiments, a slot is disposed radially inward of alternating blade posts. In various embodiments, the number of slots equals 41 and each slot has a circumferential length ranging from about 0.910 inches (23.11 mm) to about 0.930 inches (23.62 mm).

In various embodiments, a turbine rotor for a gas turbine engine includes a disk rotationally disposed about a central axis. The disk includes a bore, a rim and a web disposed radially between the bore and the rim. A plurality of blade posts is disposed on and spaced circumferentially about a radially outermost portion of the disk. A plurality of tabs is also disposed on and spaced circumferentially about a portion of the disk radially inward from the radially outermost portion of the disk. A plurality of slots may be interspersed between adjacent pairs of tabs. An axial profile of each of the tabs may include a blade post transition portion, a slope portion merging with and extending radially inward of the blade post transition portion and a face portion merging with and extending radially inward of the slope portion.

In various embodiments, the blade post transition portions have a radius of curvature of about 0.194 inches (4.92 mm) to about 0.214 inches (5.43 mm). In various embodiments, the slope portions extend radially inward at an angle of about 60 degrees to about 65 degrees with respect to the central axis, the face portions extend radially inward at an angle of about 85 degrees to about 95 degrees with respect to the central axis and the number of slots equals 41 and each slot has a circumferential length ranging from about 0.910 inches (23.11 mm) to about 0.930 inches (23.62 mm).

BRIEF DESCRIPTION OF THE DRAWINGS

The accompanying drawings illustrate various embodiments employing the principles described herein and are a part of the specification. The illustrated embodiments are meant for description and do not limit the scope of the claims.

DETAILED DESCRIPTION

All ranges may include the upper and lower values, and all ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Figure 1:
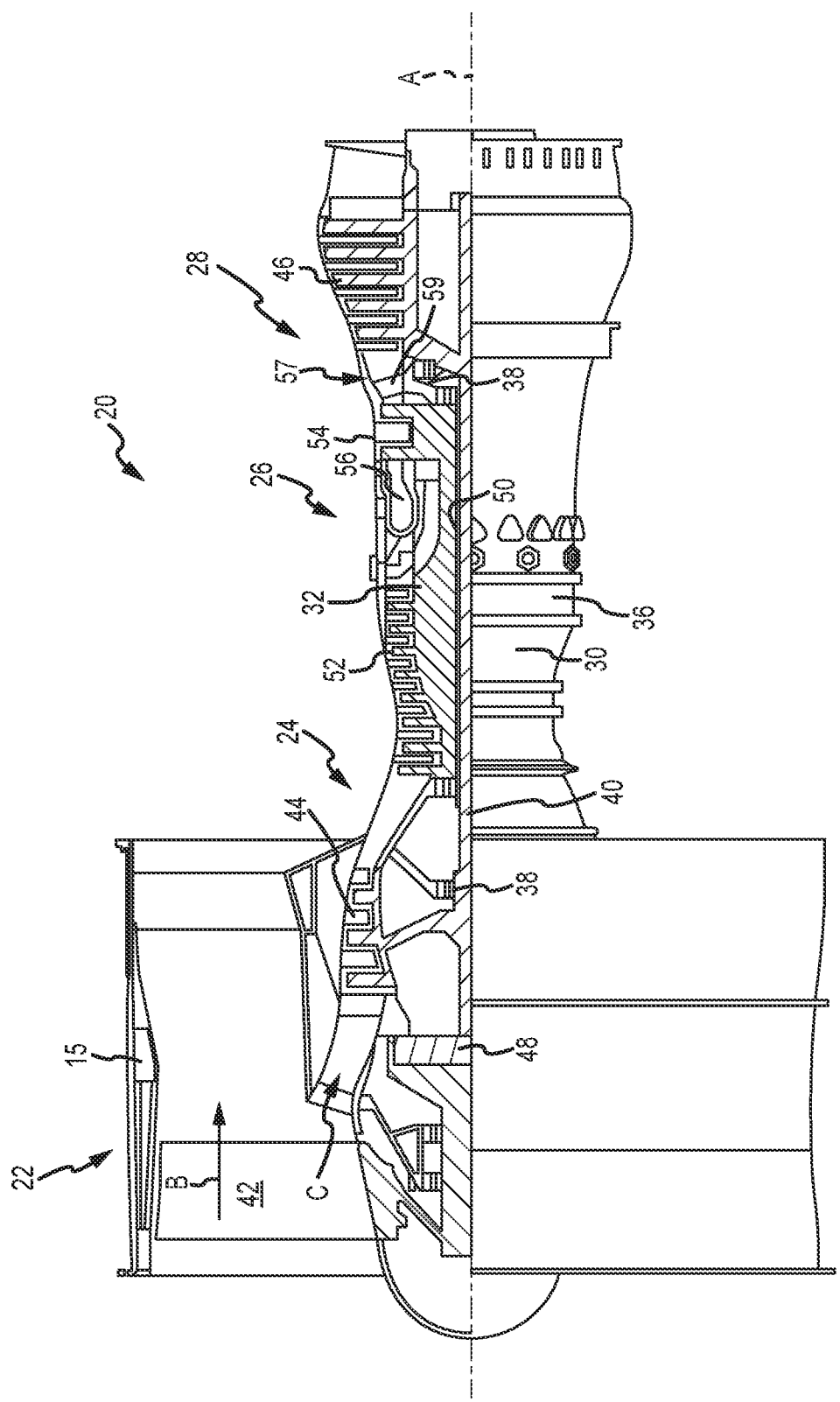
FIG. 1 is a schematic view of a gas turbine engine, in accordance with various embodiments.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core or primary flow path C tor compression and communication into the combustor section 26 and then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines, including three-spool architectures.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided and the location of the bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in this gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the gas turbine engine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via the bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 that are in the core airflow path C. The low and high speed turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, the gear system 48 may be located aft of the combustor section 26 or even aft of the turbine section 28, and the fan section 22 may be positioned forward or aft of the location of the gear system 48.

The engine 20 in one embodiment is a high-bypass geared aircraft engine. In a further embodiment, the engine 20 bypass ratio is greater than about six (6), with one embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. A low pressure turbine 46 pressure ratio is the pressure measured prior to inlet of the low pressure turbine 46 as related to the pressure at the outlet of the low pressure turbine 46 prior to an exhaust nozzle. It should be understood, however, that the above parameters are descriptive of only one embodiment of a geared architecture engine and that the present invention is applicable to other gas turbine engines, including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1bm of fuel being burned divided by 1bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram °R)÷(518.7 °R)]^0.5. The "Low corrected fan tip speed" as disclosed herein according to one non-limiting embodiment is less than about 1150 ft/second (350.5 meters/second).

Figure 2:
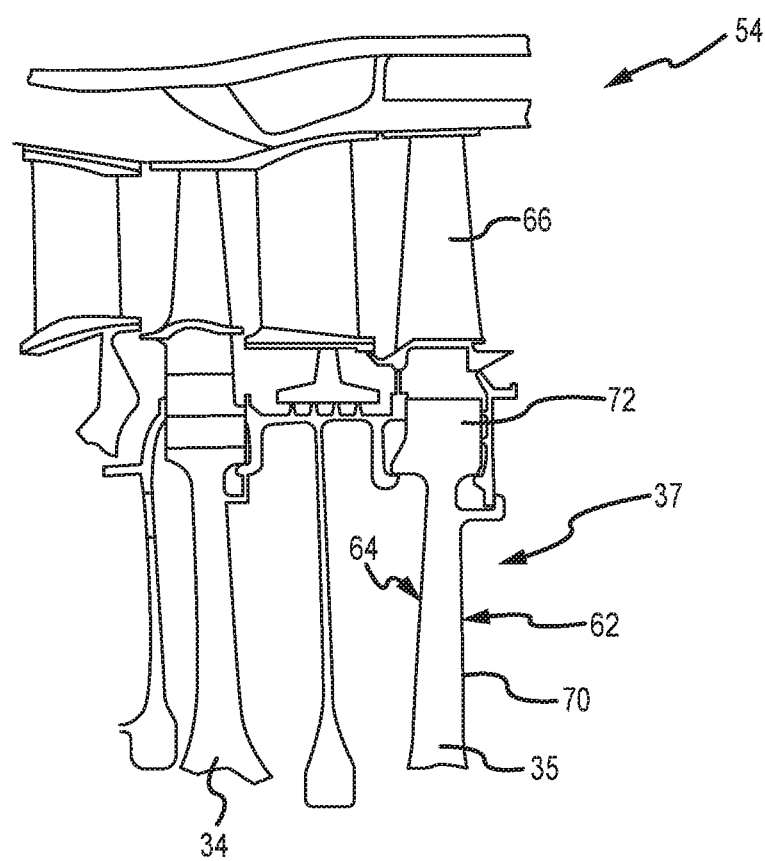
FIG. 2 is a schematic view of a turbine assembly, in accordance with various embodiments.
Figure 3:
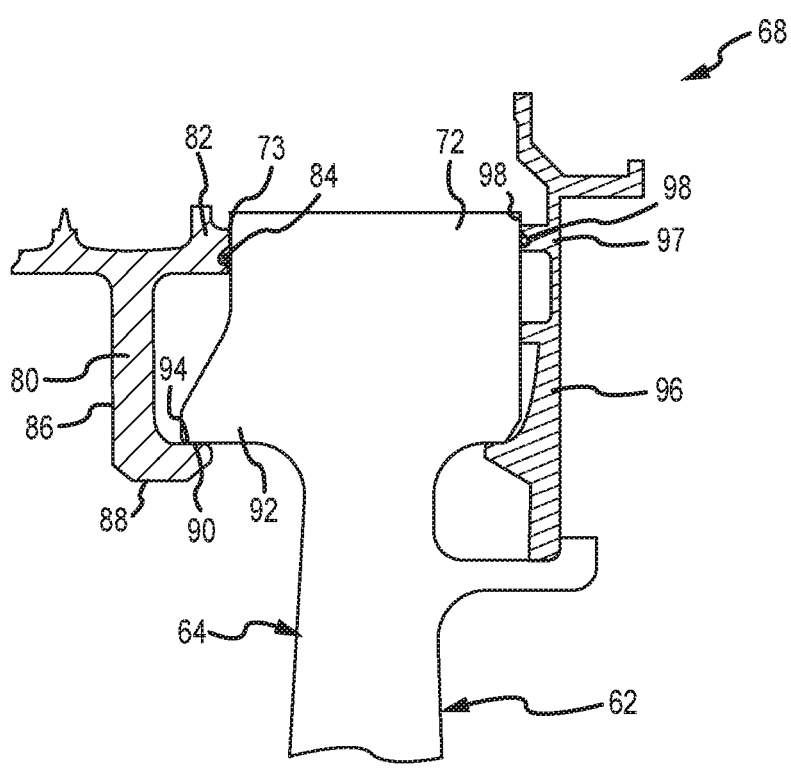
FIG. 3 is a schematic view of a rotor and seal assembly, in accordance with various embodiments.

With continued reference to FIG. 1, and with like numerals indicating like elements, FIG. 2 illustrates schematically a turbine section, such as a high pressure turbine assembly 54, while FIG. 3 illustrates schematically a close up view of a rotor and seal assembly 68. The high pressure turbine assembly 54 includes a first rotor 34 and a second rotor 35, with the second rotor 35 disposed aft (or downstream) of the first rotor 34. The second rotor 35 generally includes a bore (see, e.g., 304 at FIG. 6), a web 70 radially outward of the bore and a rim 72 radially outward of the web 70. The bore, web 70 and rim 72 extend circumferentially about the engine central longitudinal axis A and collectively comprise a rotor disk or turbine disk 37. The second rotor 35 includes an aft surface 62 and a forward surface 64. The second rotor 35 further includes a plurality of blades 66 spaced circumferentially about and connected to the rim 72. In various embodiments, the blades 66 are connected to the rim 72 using attachment sections (not shown) disposed at the base of the blades that are received within blade retention slots (see, e.g., 136 at FIG. 4) positioned within the rim 72. The attachment sections (or blade roots) and the blade retention slots can have various contours, including, for example, dove-tail, fir-tree or bulb type contours. In various embodiments, the blades 66 are formed integrally with the rim 72. While the above description has focused on the second rotor 35, the same general characteristics apply to the first rotor 34.

Referring still to FIGS. 2 and 3, the rotor and seal assembly 68 includes an annular platform 80 that extends circumferentially about the engine central longitudinal axis A. The annular platform 80 includes a base 82 that interfaces with an outer portion 73 of the rim 72. The base 82 houses a seal 84 that prevents hot gases flowing in the core airflow path C from leaking into the disk region of the rotor 35. The annular platform further includes an arm 86 and hook 88. In various embodiments, the arm 86 extends generally in a radial direction while the hook 88 extends generally in the axial direction. The hook 88 includes an upper surface 90 that is sized and configured to slidably engage a tab portion 92 of the rim 72. The tab portion 92 includes a lower surface 94 that matches the upper surface 90 of the hook 88. As described in the sections that follow, the tab portion 92 may, in various embodiments, comprise a plurality of tabs interspersed with or separated by a plurality of slots, both the tabs and slots extending circumferentially about the rim 72 of the disk 37 or rotor 35. Still referring to FIG. 3, the rotor and seal assembly 68 further includes a second annular platform 96 disposed aft of the rim 72. The second annular platform 96 includes a base 97 that interfaces with an outer portion 93 of the rim 72. The base 97 houses a seal 98 that prevents hot gases flowing in the core airflow path C from leaking into the disk region of the rotor 35.

Figure 4:
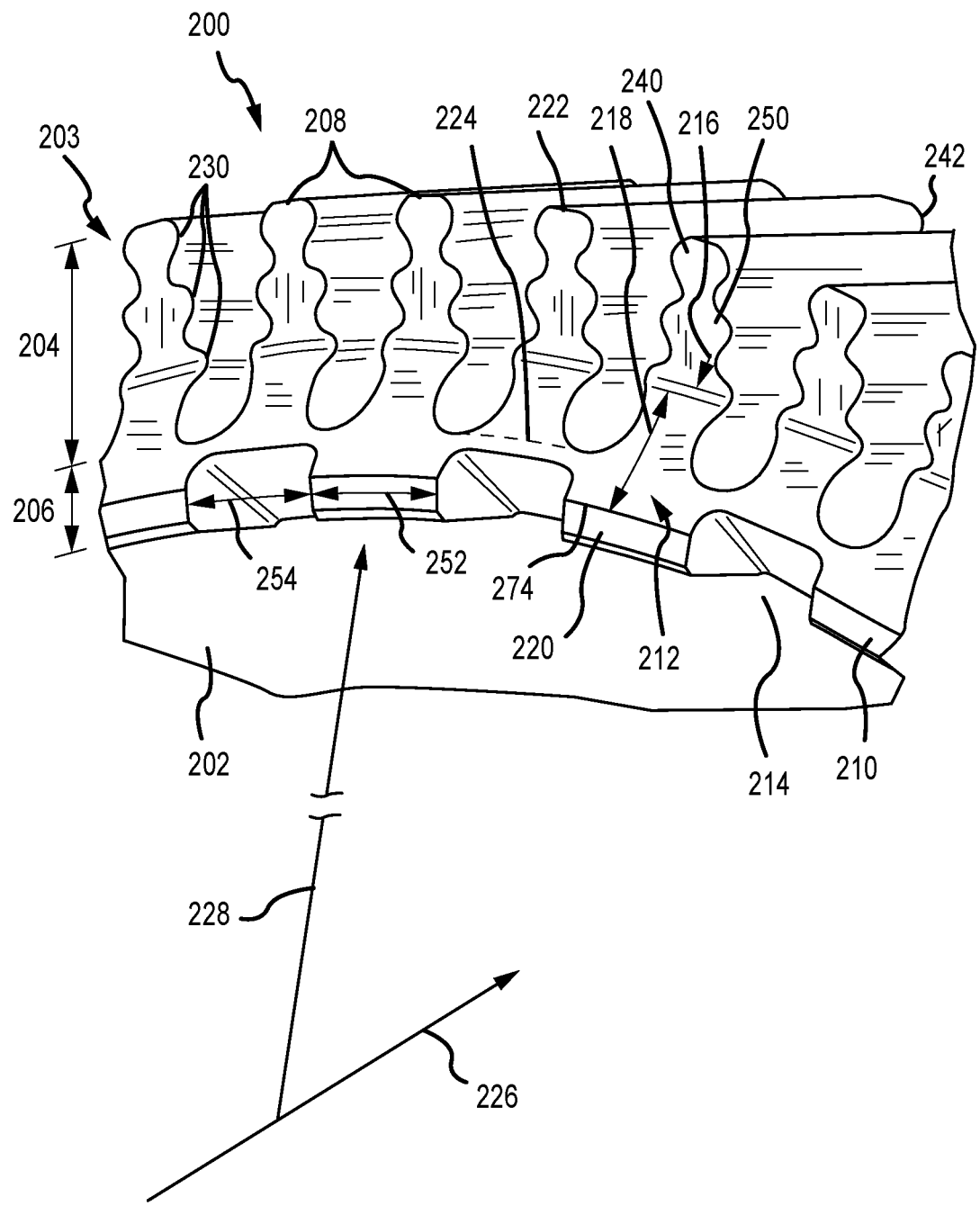
FIG. 4 is a schematic view of a rim section of a disk, in accordance with various embodiments.

Referring now to FIG. 4, a portion of a rotor disk 200 is illustrated, exhibiting various features of the present disclosure. The rotor disk 200 includes a web portion 202 and rim portion 203. The rim portion 203 includes a plurality of radially extending blade posts 208 that each includes one or more circumferentially extending branch elements 230. The branch elements 230 positioned on adjacent blade posts 208 are sized and configured to secure corresponding attachment sections of individual rotor blades. Each blade post 208 generally includes a tip 222, a base 224 a forward facing surface 240 and an aft facing surface 242. In various embodiments of the present disclosure, the forward facing surface 240 may have a first portion 250 that extends radially inward from the tip 222 to a blade post transition portion 216, positioned in a region between the tip 222 and the base 224. In various embodiments, the blade post transition portion 216 may be positioned or disposed at a location between about 25% and 50% of the length between the tip 222 and the base 224 in a radially outward direction from the base 224. In various embodiments, the blade post transition portion 216 may be positioned or disposed proximate a radially-most inward one of the branch elements 230. The forward facing surface 240 may further include a slope portion 218 that extends radially inward from the blade transition portion 216 toward the base 224. In various embodiments, the slope portion 218 also extends axially in the forward direction, thus providing a slope or a face with a surface normal that resides at a non-zero angle with respect to an axial direction 226, which is perpendicular to a radial direction 228 of the rotor disk 200.

Still referring to FIG. 4, a plurality of tabs 210 is spaced circumferentially about the rim portion 203. A slot 214 is positioned between adjacent pairs of tabs 210, providing a plurality of slots 214 circumferentially spaced about the rim portion 203. In various embodiments, a tab 210 is positioned, generally, radially inward of every other (e.g., odd numbered, counting circumferentially) blade post 208. Similarly, a slot 214 is positioned, generally, radially inward of the remaining (e.g., even numbered) blade posts 208. Positioning the tabs 210 with respect to the blade posts 208 in such manner provides an "in-phase" relation between the positioning of the tabs 210 (and the slots 214) and the blade posts 208. The "in-phase" relation contrasts with embodiments where there is no clear phase relation between the circumferential positioning of tabs with respect to the circumferential positioning of the blade posts—e.g., embodiments where some tabs are positioned radially inward of blade posts while other tabs are positioned radially inward of troughs between adjacent blade posts while still other tabs are positioned radially inward of a portion of a trough and a portion of a blade post adjacent the through. Thus, in various embodiments of the present disclosure, the number of tabs ($N_{Tabs}$) will equal the number of slots ($N_{Slots}$), while both $N_{Tabs}$ and $N_{Slots}$ will equal one-half the number of posts ($N_{Posts}$). In various embodiments, $N_{Tabs}=N_{Slots}=41$ and $N_{Posts}=82$. In various embodiments, each tab 210 may have a circumferential length 252 and each slot 214 may have a circumferential length 254. In addition, in various embodiments, the circumferential length 252 of each tab 210 may be about the same as the circumferential length 254 of each slot 214. In various embodiments, the circumferential length 252 of each tab 210 may be greater than or less than the circumferential length 254 of each slot 214. In various embodiments, the circumferential length 254 of each slot 214 has a value within a range from about 0.900 inches (22.86 mm) to about 0.950 inches (24.13 mm). In various embodiments, the circumferential length 254 of each slot 214 has a value within a range from about 0.910 inches (23.11 mm) to about 0.930 inches (23.62 mm) and $N_{Tabs}=N_{Slots}=41$.

Figure 5:
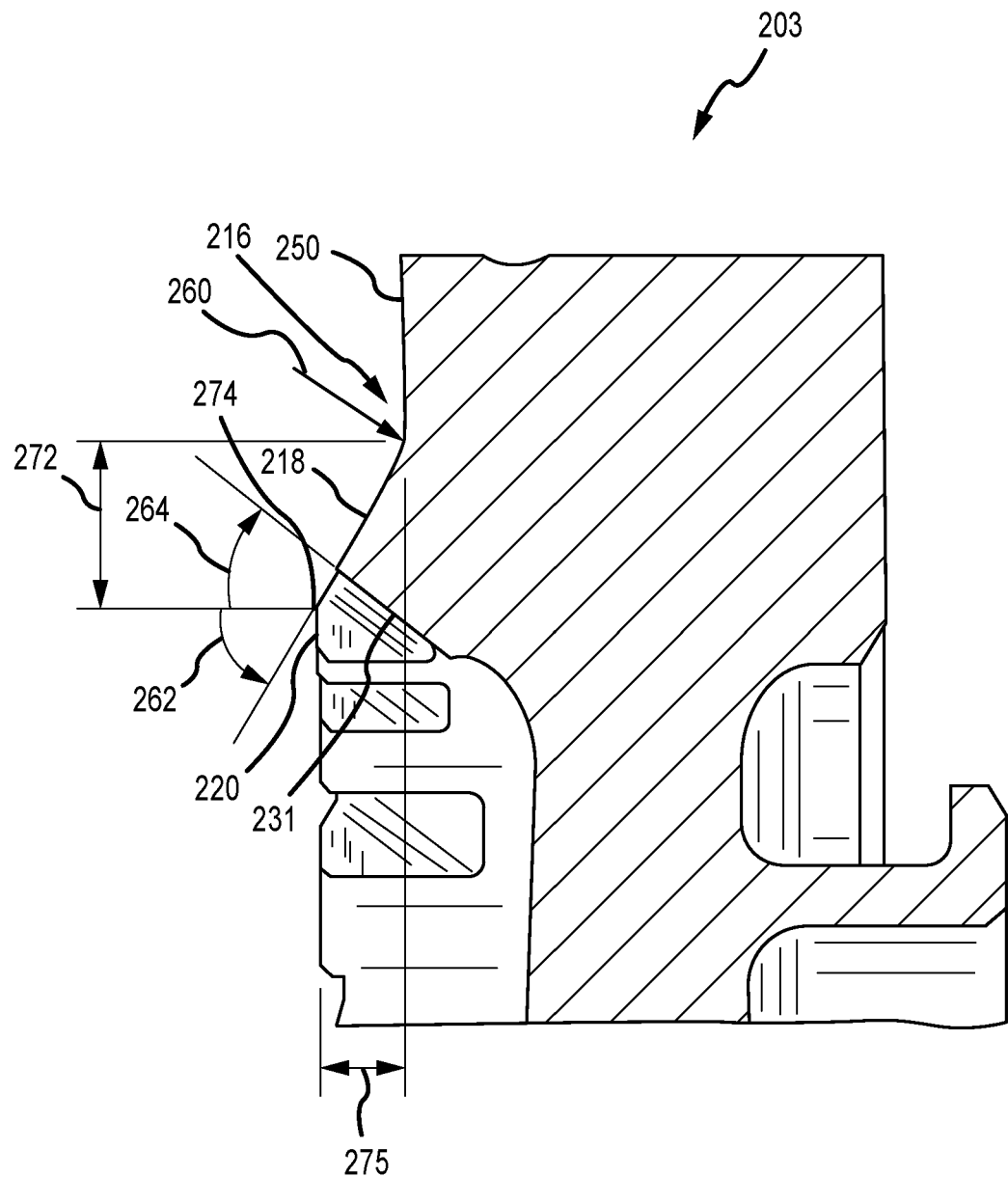
FIG. 5 is a cross sectional view of a rim and web section of a disk, in accordance with various embodiments.

Referring now to FIGS. 4 and 5, various geometries for the tabs 210, slots 214 and forward facing surfaces 240 with respect to the rim portion 203 are described. As stated above, the forward facing surface 240 of each blade post 208 includes a first portion 250 that extends radially inward from the tip 222 to a blade post transition portion 216, positioned in a region between the tip 222 and the base 224. The forward facing surface 240 may further include a slope portion 218 that extends radially inward from the blade transition portion 216 toward the base 224. In various embodiments, the slope portion 218 may extend beyond the base 224 to intersect with a face portion 220 of a tab 210. Intersection of the slope portion 218 with a face portion 220 typically occurs where a tab 210 is disposed radially inward of a post 208, as illustrated in FIG. 4. In various embodiments, the face portion 220 of each tab 210 extends radially inward at an angle of about 85 degrees to about 95 degrees with respect to the longitudinal axis of the rotor disk 200 or the engine central longitudinal axis A. In various embodiments, the face portion 220 extends radially inward at an angle of about 90 degrees with respect to the longitudinal axis of the rotor disk 200. In other words, at an angle of 90 degrees, the face portion 220 defines a surface that is normal (i.e., perpendicular) to the central longitudinal axis A.

Still referring to FIGS. 4 and 5, the forward facing surface 240 of each blade post 208, including the first portion 250, the blade transition portion 216 and the slope portion 218 defines an axial profile. For blade posts 208 having a tab 210 positioned radially inward of the base 224, the axial profile will include the face portion 220 of the tab 210. For blade posts 208 having a slot 214 positioned radially inward of the base, the axial profile will terminate at the radially outermost part of the slot. The axial profile may include sub-profiles. For example, the axial profile may include a first axial profile extending from the blade transition portion 216 to the face portion 220 of a tab 210 and including the slope portion 218. Generally, the blade posts are positioned in a first radially outermost rim portion 204 while the tabs 210 and slots are positioned in a second radially outermost rim portion 206. The second radially outermost rim portion 206 resides radially inward of the first radially outermost rim portion 204.

In various embodiments, the blade transition portion 216, the slope portion 218 and the face portion 220 may be defined through specified geometrical values. For example, referring primarily to FIG. 5, the blade transition portion 216 may include a radius of curvature 260. In various embodiments, the radius of curvature 260 may have values ranging from about 0.100 inches (2.54 mm) to about 0.300 inches (7.62 mm). In various embodiments, the radius of curvature may range from about 0.194 inches (4.92 mm) to about 0.214 inches (5.43 mm). In various embodiments, the radius of curvature 260 may be specified to have a value of about 0.204 inches (5.18 mm). Similarly, the slope portion 218 may be defined by a slope angle 262. In various embodiments, the slope angle 262 may have a value of about 60 degrees to about 65 degrees, with the angle defined as extending radially inward from an axial direction. In various embodiments, the slope angle 262 may range from about 61.5 degrees to about 62.5 degrees. In various embodiments, the slope angle 262 may be specified to be about 62 degrees. The geometry of the slots 214 may also be defined by geometrical values. For example, each slot 214 may include a roof portion 231 that is defined by a roof angle 264. In various embodiments, the roof angle 264 may range from about 35 degrees to about 45 degrees, with the angle defined as extending radially outward from an axial direction. In various embodiments, the roof angle 264 may range from about 39.5 degrees to about 40.5 degrees. In various embodiments, the roof angle 264 may be specified to be about 40 degrees. In various embodiments, a radial length 272 between the blade transition portion 216 and a radially outermost point 274 of the face portion 220 of each tab 210 has a value within a range of about 0.590 inches (14.98 mm) to about 0.600 inches (15.24 mm). In various embodiments, an axial length 275 between the first portion 250 of the blade posts 208 and the face portion 220 of the tabs 210 has a value within a range of about 0.290 inches (7.36 mm) and about 0.300 inches (7.62 mm).

Figure 6:
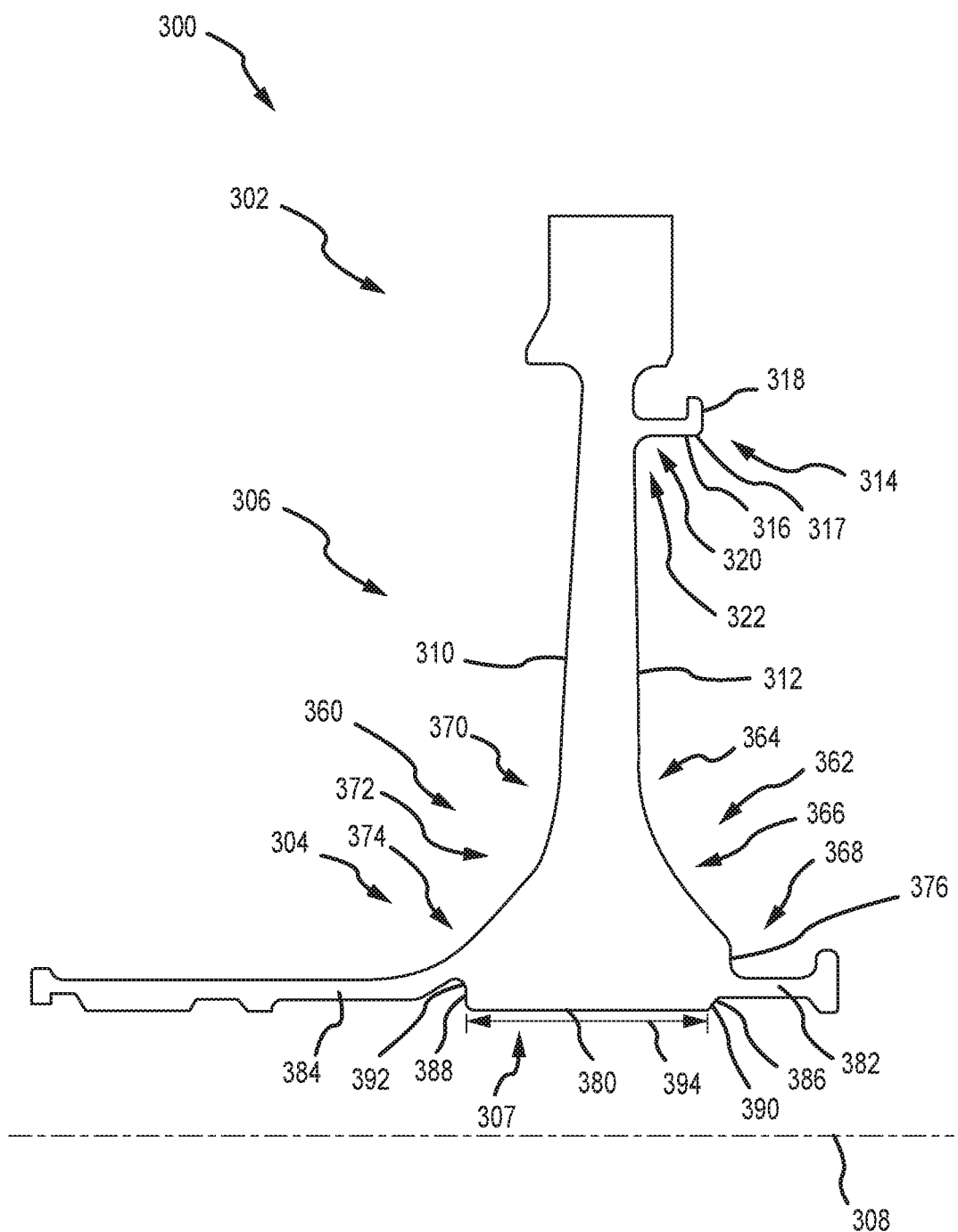
FIG. 6 is a cross sectional view of a turbine disk, in accordance with various embodiments.

Referring now to FIG. 6, a cross sectional view of a turbine disk 300, in accordance with various embodiments is illustrated. The turbine disk 300 includes a rim portion 302 and a bore portion 304. A web portion 306 is disposed radially between the rim portion 302 and the bore portion 306. In various embodiments, each of the rim portion 302, the bore portion 304 and the web portion 306 is annular about a central axis 308. The web portion 306 may include a fore surface 310 and an aft surface 312. The turbine disk 300 may further include a cylindrical arm 314 disposed on and intersecting the aft surface 312. The cylindrical arm 314 may include a first portion 316 that extends generally in an axial direction from the aft surface 312. A second portion 318 of the cylindrical arm 314 extends radially outward from a distal end 317 of the first portion 316. In various embodiments, the cylindrical arm 314 may be axisymmetric about the central axis 308. In various embodiments, the cylindrical arm 314 may comprise a plurality of segments spaced circumferentially about the central axis 308, with spaces or slots positioned between adjacent segments. The intersection of the cylindrical arm 314 with the aft surface 312 of the web portion 306 may define a fillet 320 radially inward of the first portion 316 of the cylindrical arm 314.

Figure 7:
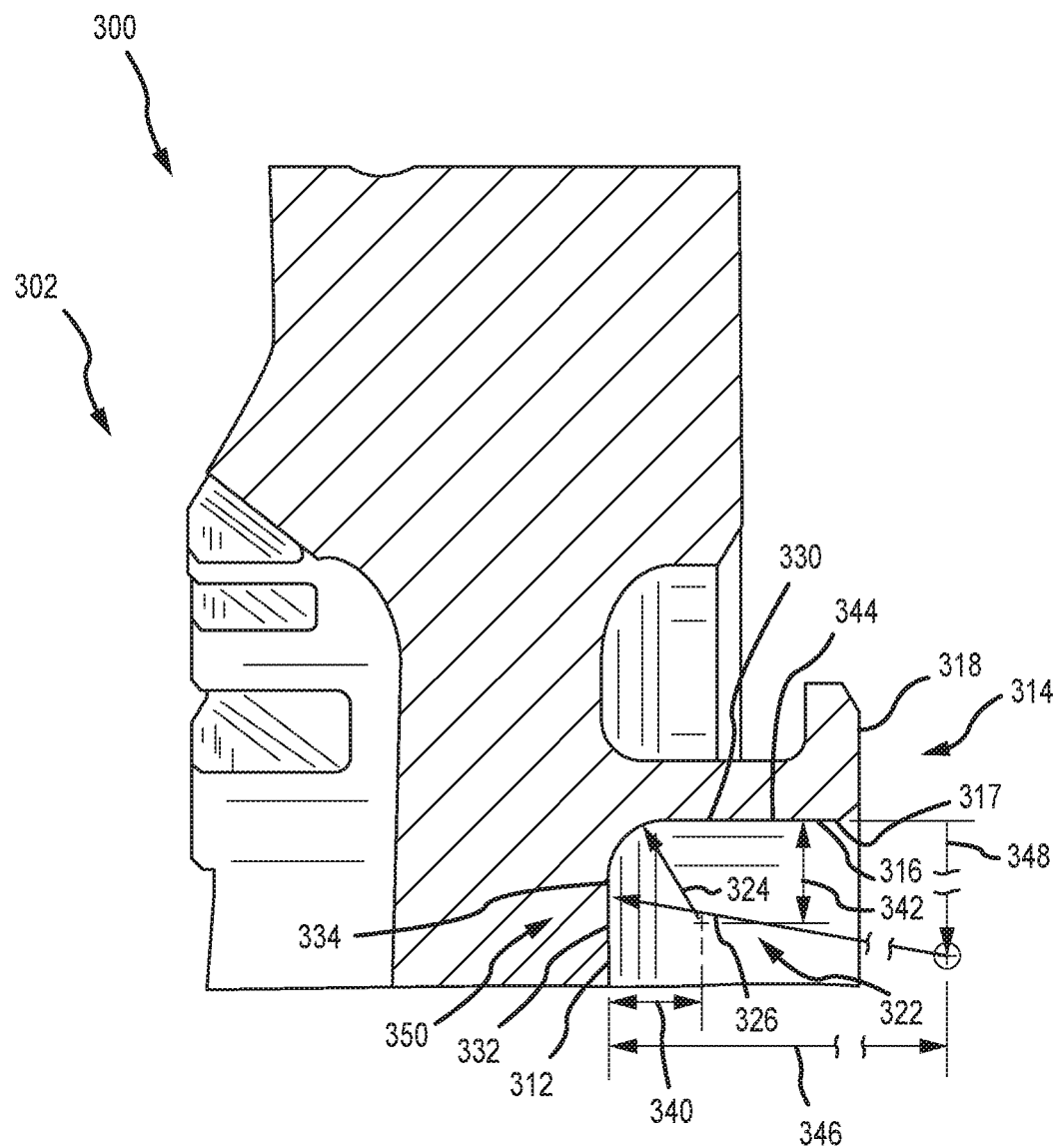
FIG. 7 is a cross sectional view of a rim and web section of a disk, in accordance with various embodiments.

In various embodiments, the fillet 320 may comprise a compound fillet 322. For example, with continued reference to FIG. 6, and with like numerals indicating like elements, FIG. 7 provides a cross sectional close-up view of a compound fillet 322, in accordance with various embodiments, near the rim portion 302 of the turbine disk 300. In various embodiments, the compound fillet 322 may be defined by a compound radius, which may include a minor radius 324 and a major radius 326. In various embodiments, the minor radius 324 is defined by a minor radius of curvature having a range from about 0.190 inches (4.82 mm) to about 0.220 inches (5.58 mm) and the major radius 326 is defined by a major radius of curvature having a range from about 4.400 inches (111.76 mm) to about 4.600 inches (116.84 mm). In various embodiments, the minor radius 324 is defined by a minor radius of curvature having a range from about 0.200 inches (5.08 mm) to about 0.210 inches (5.334 mm) and the major radius 326 is defined by a major radius of curvature having a range from about 4.469 inches (113.51 mm) to about 4.531 inches (115.08 mm).

In various embodiments, an axial value 340 of the origin of the minor radius 324 is positioned within an axial range from about 0.200 inches (5.08 mm) to about 0.240 inches (6.09 mm) aft of the aft surface 312. In various embodiments, a radial value 342 of the origin of the minor radius is also positioned within a radial range from about 0.200 inches (5.08 mm) to about 0.240 inches (6.09 mm) radially inward of a radially inward surface 344 of the first portion 316 of the cylindrical arm 314. In various embodiments, the axial value 340 of the origin of the minor radius 324 is positioned within an axial range from about 0.213 inches (5.41 mm) to about 0.223 inches (5.66 mm) aft of the aft surface 312. In various embodiments, the radial value 342 of the origin of the minor radius is also positioned within a radial range from about 0.213 inches (5.41 mm) to about 0.223 inches (5.66 mm) radially inward of the radially inward surface 344 of the first portion 316 of the cylindrical arm 314.

In various embodiments, an axial value 346 of the origin of the major radius 326 is positioned within an axial range from about 4.400 inches (111.76 mm) to about 4.600 inches (116.84 mm) aft of the aft surface 312. In various embodiments, a radial value 348 of the origin of the major radius is also positioned within a radial range from about 0.400 inches (10.16 mm) to about 0.480 inches (12.18 mm) radially inward of the radially inward surface 344 of the first portion 316 of the cylindrical arm 314. In various embodiments, the axial value 346 of the origin of the major radius 326 is positioned within an axial range from about 4.469 inches (113.51 mm) to about 4.531 inches (115.08 mm) aft of the aft surface 312. In various embodiments, the radial value 348 of the origin of the major radius is also positioned within a radial range from about 0.426 inches (10.82 mm) to about 0.446 inches (11.32 mm) radially inward of the radially inward surface 344 of the first portion 316 of the cylindrical arm 314. In various embodiments, the radial value 348 of the origin of the major radius 326 has a value equal to the radial value 342 of the origin of the minor radius 324.

In various embodiments, the minor radius 324 intersects tangentially with the radially inward surface 344 of the first portion 316 of the cylindrical arm 314, thereby defining a first point of tangency 330. In various embodiments, the major radius 326 intersects tangentially with the aft surface 312, thereby defining a second point of tangency 332. In various embodiments, the minor radius 324 and the major radius 326 intersect tangentially with each other, thereby defining a third point of tangency 334. In various embodiments, the third point of tangency 334 defines a tangent plane that is tangent with the aft surface 312. In various embodiments, the minor radius 324 and the major radius 326 may intersect non-tangentially with one another. In various embodiments, smoothing of the non-tangential intersection may occur in a smoothing region 350 to remove sharp or discontinuous interfaces. Smoothing regions may also occur at the intersection of the minor radius 324 and the radially inward surface 344 of the first portion 316 of the cylindrical arm 314 and at the intersection of the major radius 326 and the aft surface 312 radially inward of the first portion 316 of the cylindrical arm 314.

Referring still to FIG. 6, the bore 304 is illustrated having a fore surface 360 and an aft surface 362. The aft surface 362 of the bore 304 includes an aft web transition portion 364, an aft ramp portion 366 and an aft base transition portion 368. Likewise, the fore surface 360 includes a fore web transition portion 370, a fore ramp portion 372 and a fore base transition portion 374. In various embodiments, the aft web transition portion 364 and the fore web transition portion are positioned at a radial length equal to about 14 inches (355.6 mm) to about 15 inches (381 mm) from an axial center line or central axis 308. In various embodiments, either or both of the aft ramp portion 366 and the fore ramp portion 372 have substantially linear profiles, meaning the profiles have curvature radii greater than about 5 inches (127 mm). In various embodiments, the curvature radii may have values equal to about 2 inches (50.8 mm) and in various embodiments the curvature radii may range from about 2 inches (50.8 mm) to about 5 inches (127 mm). In various embodiments, either or both of the aft ramp portion 366 and the fore ramp portion 372 include linear segments between their respective web and base transition portions. In various embodiments, the linear segments may span the entire ramp portions. The aft base transition portion 368 may include a face portion 376 that defines a surface normal pointing in a direction substantially parallel with the central axis 308—e.g., within a range of angles from about 0 degrees (parallel) to about 20 degrees, pointing radially outward from the central axis 308. In various embodiments, the face portion 376 defines a surface normal pointing in a direction parallel with the central axis 308.

In various embodiments, the aft web transition portion 364 may be defined by a first radius of curvature that smoothly connects the aft surface 312 of the web portion 306 and the aft ramp portion 366. Likewise, the fore web transition portion 370 may be defined by a second radius of curvature that smoothly connects the fore surface 310 of the web portion 306 and the fore ramp portion 372. In various embodiments, the first radius of curvature and the second radius of curvature are equal in value. The first and second radii of curvature may have values equal to about 2 inches (50.8 mm) in various embodiments, between about 2 inches (50.8 mm) and about 5 inches (127 mm) in various embodiments and greater than 5 inches (127 mm) in various embodiments.

In various embodiments, the web portion 306 further includes a base portion 307. The base portion 307 may include a spool engagement surface 380 and may further include a first arm 382 extending in the aft direction and a second arm 384 extending in the fore direction. In various embodiments, the spool engagement surface 380 has a length 394 within a range from about 3.6 (91.44 mm) inches to about 3.7 inches (93.98 mm). The base portion 307 may further include a radially extending first transition portion 386 connecting an aft end of the spool engagement surface 380 to a radially inward portion of the first arm 382 and a radially extending second transition portion 388 connecting a fore end of the spool engagement surface 380 to a radially inward portion of the second arm 384. The radially extending first transition portion 386 may include a first face portion 390 that defines a surface normal pointing in a direction substantially parallel with the central axis 308—e.g., within a range of angles from about 0 degrees (parallel) to about 20 degrees, pointing radially outward from the central axis 308. In various embodiments, the first face portion 390 defines a surface normal pointing in a direction parallel with the central axis 308. Similarly, the radially extending second transition portion 388 may include a second face portion 392 that defines a surface normal pointing in a direction substantially parallel with the central axis 308—e.g., within a range of angles from about 0 degrees (parallel) to about 20 degrees, pointing radially outward from the central axis 308, but in a direction opposite that of the first face portion 390. In various embodiments, the second face portion 392 defines a surface normal pointing in a direction parallel with the central axis 308, though opposite that of the first face portion 390.

Various embodiments of the present disclosure are believed to provide improved distributions of stress—e.g., axial, radial and hoop—throughout the turbine disk while tending to minimize local increases in weight to reduce maximum stress values occurring at discontinuities and regions of high curvature. For example, adding weight to the rim portion near the tabs allows a reduction in maximum stress values through a reduction in discontinuities and regions of high curvature. Similarly, adding weight to the bore region through use of substantially linear ramp portions or the incorporation of base transition portions as described above provide reductions in maximum stress values.

With reference to the foregoing illustrations, description and embodiments, the turbine rotors or turbine disks are described as devices for utilization in a turbine section of a gas turbine engine. One of skill in the art, having the benefit of this disclosure, will understand that the disclosed rotors or disks can be utilized in other stages or sections of a gas turbine engine. Furthermore, while described above within the context of a geared turbofan engine, one of skill in the art will understand the above described rotor or disk can be beneficially utilized in other turbine applications including, but not limited to, direct drive turbine engines, land based turbines, and marine turbines.

Finally, it is further understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed:

1. A turbine rotor, comprising:
  a disk rotationally disposed about a central axis, the disk including
  a bore,
  a rim and
  a web disposed radially between the bore and the rim;
  a first rim portion and a second rim portion, the second rim portion disposed radially inward of the first rim portion;
  the first rim portion including a first blade post and a second blade post, the second blade post spaced circumferentially a distance from the first blade post;
  the second rim portion including a first tab positioned radially inward of the first blade post and a second tab positioned radially inward of the second blade post;
  a slot disposed circumferentially between the first tab and the second tab;
  a third blade post positioned circumferentially between the first blade post and the second blade post and radially outward of the slot,
  wherein the first tab and the second tab have an axial profile, when viewed in a circumferential direction, that includes a blade post transition portion which directly connects two different axially facing surfaces, the blade transition portion disposed circumferentially adjacent a radially inward most branch of a plurality of branches spaced radially between a base and a tip of the first blade post and the second blade post and at a radial distance from the central axis equal to that of the radially inward most branch; a slope portion radially inward of the blade transition portion; and a face portion radially inward of the slope portion; and the slot has a circumferential length equal to a circumferential length of each of the first tab and the second tab measured at the face portion.

2. The turbine rotor of claim 1, wherein the slot has a circumferential length ranging from 0 0.910 inches to 0 0.930 inches.

3. The turbine rotor of claim 1, wherein the tip and the base of the first blade post define a length in the radial direction and wherein the blade post transition portion is disposed at a location between 25% and 50% of the length in the radially outward direction.

4. The turbine rotor of claim 3, wherein the slope portion of the first tab extends radially inward from the blade post transition portion.

5. The turbine rotor of claim 4, wherein the slope portion of the first tab extends radially inward from the blade post transition portion at an angle with respect to the central axis and wherein the slope portion merges with the face portion.

6. The turbine rotor of claim 4, wherein the slope portion extends radially inward at an angle of 60 degrees to 65 degrees with respect to the central axis and wherein the blade post transition portion has a radius of curvature of 0.194 inches to 0.214 inches.

7. The turbine rotor of claim 5, wherein the slope portion extends radially inward at an angle of 60 degrees to 65 degrees with respect to the central axis and wherein the face portion extends radially inward at an angle of 85 degrees to 95 degrees with respect to the central axis.

8. The turbine rotor of claim 7, wherein a radial length between the blade transition portion and a radially outermost point of the face portion ranges from 0.590 inches to 0.600 inches.

9. A turbine rotor, comprising:
a disk rotationally disposed about a central axis, the disk including
a bore,
a rim and
a web disposed radially between the bore and the rim;
a plurality of blade posts disposed on and spaced circumferentially about a radially outermost portion of the disk;
a plurality of tabs disposed on and spaced circumferentially about a portion of the disk radially inward from the radially outermost portion of the disk, each tab having an axial profile, when viewed in a circumferential direction, and
a plurality of slots circumferentially interspersed between adjacent pairs of tabs,
wherein the axial profile of each one of the plurality of tabs includes a blade post transition portion which directly connects two different axially facing surfaces, the blade transition portion disposed circumferentially adjacent a radially inward most branch of a plurality of branches spaced radially between a base and a tip of each of the plurality of blade posts and at a radial distance from the central axis equal to that of the radially inward most branch; a slope portion radially inward of the blade transition portion; and a face portion radially inward of the slope portion; and each of the plurality of slots has a circumferential length equal to a circumferential length of each of the plurality of tabs measured at the face portion.

10. The turbine rotor of claim 9, wherein the slope portions extend radially inward from the blade post transition portions at an angle with respect to the central axis and wherein the slope portions merge with the face portions.

11. The turbine rotor of claim 10, wherein the blade post transition portions have a radius of curvature of 0 0.194 inches to 0.214 inches.

12. The turbine rotor of claim 11, wherein the slope portions extend radially inward at an angle of between 60 degrees and 65 degrees with respect to the central axis.

13. The turbine rotor of claim 12, wherein the slope portions extend radially inward at an angle of 62 degrees with respect to the central axis and wherein each corresponding face portion extends radially inward at an angle of 90 degrees with respect to the central axis.

14. The turbine rotor of claim 9, wherein a slot is disposed radially inward of alternating blade posts.

15. The turbine rotor of claim 9, wherein the number of slots equals 41 and wherein each slot has a circumferential length ranging from 0 0.910 inches to 0.930 inches.

16. A turbine rotor, comprising:
a disk rotationally disposed about a central axis, the disk including
a bore,
a rim and
a web disposed radially between the bore and the rim;
a plurality of blade posts disposed on and spaced circumferentially about a radially outermost portion of the disk;
a plurality of tabs disposed on and spaced circumferentially about a portion of the disk radially inward from the radially outermost portion of the disk, each tab having an axial profile, when viewed in a circumferential direction; and
a plurality of slots interspersed between adjacent pairs of tabs;
wherein the axial profile of each one of the plurality of tabs includes a blade post transition portion which directly connects two different axially facing surfaces, the blade transition portion disposed circumferentially adjacent a radially inward most branch of a plurality of branches spaced radially between a base and a tip of each of the plurality of blade posts and at a radial distance from the central axis equal to that of the radially inward most branch; a slope portion merging with and extending radially inward of the blade post transition portion; and a face portion merging with and extending radially inward of the slope portion; and each of the plurality of slots has a circumferential length equal to a circumferential length of each of the plurality of tabs measured at the face portion.

17. The turbine rotor of claim 16, wherein the blade post transition portions have a radius of curvature of 0.194 inches to 0.214 inches, wherein the slope portions extend radially inward at an angle of 60 degrees to 65 degrees with respect to the central axis, wherein the face portions extend radially inward at an angle of 85 degrees to 95 degrees with respect to the central axis and wherein the number of slots equals 41 and each slot has a circumferential length ranging from 0.910 inches to 0.930 inches.

* * * * *